No. 875,510. PATENTED DEC. 31, 1907.
P. ENGEN.
TRAP SETTER.
APPLICATION FILED JULY 9, 1907.
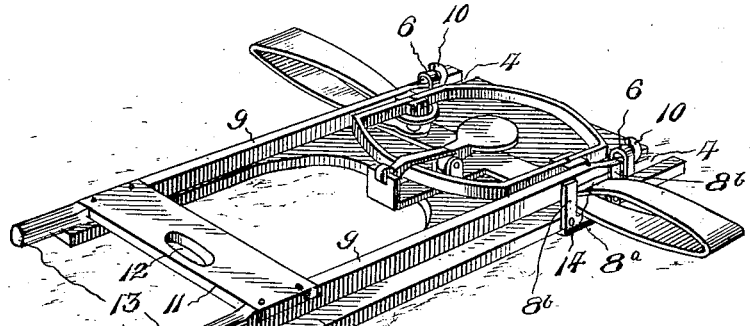
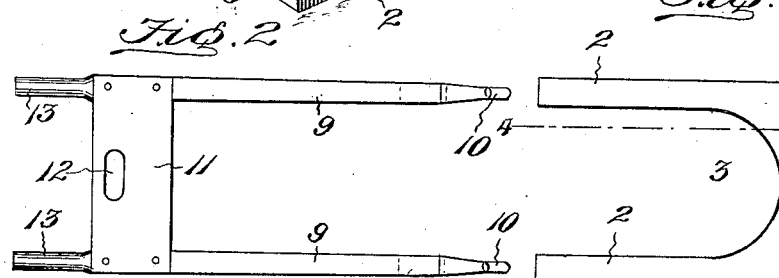
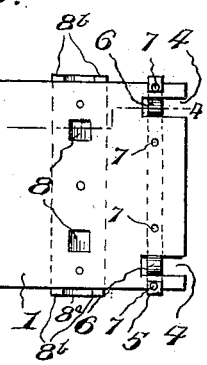
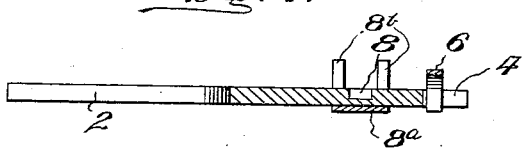
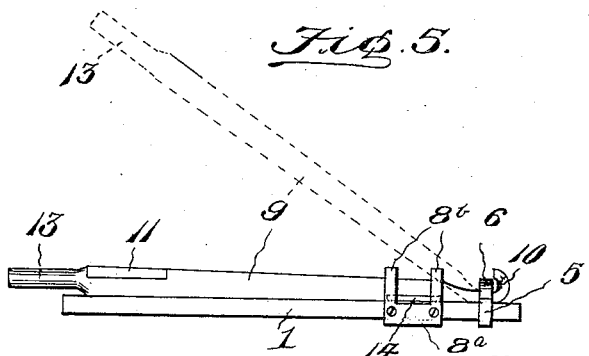
Inventor
Peter Engen,
Witnesses
J. T. L. Wright,
By Victor J. Evans
Attorney

UNITED STATES PATENT OFFICE.

PETER ENGEN, OF TOWNSEND, MONTANA.

TRAP-SETTER.

No. 875,510.　　　Specification of Letters Patent.　　　Patented Dec. 31, 1907.

Application filed July 9, 1907. Serial No. 382,897.

*To all whom it may concern:*

Be it known that I, PETER ENGEN, a citizen of the United States of America, residing at Townsend, in the county of Broadwater and State of Montana, have invented new and useful Improvements in Trap-Setters, of which the following is a specification.

This invention relates to trap setters, the principal object of the same being to provide a device of simple construction which will operate quickly for setting the ordinary steel-jaw traps without danger of injury to the hand of the user.

Another object of the invention is to provide a device for setting steel traps which can be quickly connected to the trap and which will hold the jaws open by placing the foot upon one member of the trap setter, thus giving both hands for use in setting the trigger and arranging the bait.

These and other objects may be attained by means of the construction illustrated in the accompanying drawing, in which:

Figure 1 is a perspective view of a trap setter made in accordance with my invention, said trap setter being shown in use with a steel trap having the jaws open and the trap set. Fig. 2 is a plan view of the movable member of my trap setter. Fig. 3 is a similar view of the base or rigid member of the trap setter. Fig. 4 is a longitudinal section on the line 4—4 of Fig. 3. Fig. 5 is a side elevation of the trap setter, and showing in dotted lines the position of the movable member for inserting a trap.

Referring to the drawing for a more particular description of my invention, the numeral 1 designates the base or rigid member of the trap setter, said base consisting of a board provided with backwardly extending arms 2 providing a recess 3 between said arms. At the outer end of said base slots 4 are formed near the opposite edges thereof, and a strip of sheet metal 5 is extended across the base and spanning said slot, said strip having upwardly bent loops 6 which form hinges for the movable member, said strip being connected by suitable fastenings 7 to the base. Recesses 8 are formed in the upper surface of the base at points to accommodate the pivots of the springs of the trap. A cross bar $8^a$ is secured to the base 1 and is provided with upwardly extending lugs $8^b$, said lugs forming stops for the springs of the trap and to prevent the trap from slipping when placed in position to be set.

The hinged or movable member of the trap setter consists of a pair of bars 9, each provided with a hook 10 at one end, said bars being connected by a cross piece 11 having a hand hold 12 therein for carrying the trap setter, and a pair of handles 13 for operating the same. The hooks 10 are engaged with the loops 6 of the base member 1. Wear plates 14 are secured to the bars 9 in position to bear upon the springs of the traps and prevent the wear of the trap setter in use.

The operation of my invention may be briefly described as follows: The bars 9 are raised to the dotted line position shown in Fig. 5 and a steel trap is placed upon the base member 1 with the pintles for the springs located within the recesses 8 in the base. The bars 9 are then depressed to the full line position shown in Fig. 1, and the foot of the user may be placed upon the cross piece 11, thus holding the steel strap in the position shown in Fig. 1, and leaving both hands free for setting the trap and arranging the bait. When the trap has been set the movable member may be raised to the dotted line position shown in Fig. 5 and the trap removed from the trap setter and placed in position for use.

From the foregoing it will be obvious that a trap setter made in accordance with my invention is of simple construction, is comparatively light in weight, can be operated quickly for setting traps, and is reliable and efficient in use.

Having thus described the invention, what I claim is:

1. A trap setter comprising a base provided with end slots, a metal strip secured to said base and having loops extending upward through said slots, and a movable member comprising bars, a cross piece connecting said bars, and hooks on said movable member to engage the loops on the base member.

2. A trap setter comprising a base having recesses in the top side thereof for the pintles of the trap springs, a metal strip secured to said base and provided with loops, a movable member comprising bars, a cross piece connecting said bars, and wear plates secured to said bars, and hooks on the movable member adapted to engage said loops, substantially as described.

In testimony whereof, I affix my signature in presence of two witnesses.

PETER ENGEN.

Witnesses:
   J. B. SCHMIDT,
   CON O. LEAY.